US010534323B2

(12) United States Patent
Imamura (10) Patent No.: US 10,534,323 B2
(45) Date of Patent: Jan. 14, 2020

(54) TIMEPIECE, METHOD OF CONTROLLING TIMEPIECE DISPLAY, AND STORAGE MEDIUM

(71) Applicant: CASIO COMPUTER CO., LTD., Tokyo (JP)

(72) Inventor: Keiichi Imamura, Tokyo (JP)

(73) Assignee: CASIO COMPUTER CO., LTD., Tokyo (JP)

(*) Notice: Subject to any disclaimer, the term of this patent is extended or adjusted under 35 U.S.C. 154(b) by 182 days.

(21) Appl. No.: 15/855,779

(22) Filed: Dec. 27, 2017

(65) Prior Publication Data
US 2018/0181078 A1   Jun. 28, 2018

(30) Foreign Application Priority Data

Dec. 28, 2016   (JP) ................................. 2016-256630

(51) Int. Cl.
*G04G 9/02*   (2006.01)
*G06T 11/60*   (2006.01)
*G04G 9/00*   (2006.01)

(52) U.S. Cl.
CPC ................ *G04G 9/02* (2013.01); *G06T 11/60* (2013.01); *G04G 9/007* (2013.01)

(58) Field of Classification Search
CPC ........ G04G 9/02; G04G 9/0064; G04G 9/007; G06T 11/00; G06T 11/60
USPC ......................................................... 368/239
See application file for complete search history.

(56) References Cited

U.S. PATENT DOCUMENTS

| 4,531,841 A * | 7/1985 | Puff ................... G04B 45/0061 368/228 |
| 2007/0213955 A1* | 9/2007 | Ishida ..................... G04G 9/00 702/178 |
| 2015/0172438 A1* | 6/2015 | Yang ................. H04M 1/72533 455/419 |

FOREIGN PATENT DOCUMENTS

| JP | S55-124089 A | 9/1980 |
| JP | S58-68689 A | 4/1983 |
| JP | S58-88692 A | 5/1983 |
| JP | S62-5312 B2 | 2/1987 |
| JP | 2006242717 A | 9/2006 |

(Continued)

OTHER PUBLICATIONS

Japanese Office Action dated Oct. 8, 2019, in a counterpart Japanese patent application No. 2016-256630. A machine translation (not reviewed for accuracy) attached).

*Primary Examiner* — Edwin A. Leon
(74) *Attorney, Agent, or Firm* — Chen Yoshimura LLP (57) ABSTRACT

A timepiece includes: one or more processors; and a display unit controlled by the one or more processors, wherein the one or more processors perform: a clock hand image obtaining process that obtains a clock hand image; an information obtaining process that obtains prescribed information; a display control process that controls the display unit so as to display on the display unit the clock hand image obtained by the clock hand image obtaining process and the prescribed information obtained by the information obtaining process; a synthesizing process that synthesizes image data of the clock hand image and an image for the prescribed information such that the clock hand image does not overlap with a display region for the prescribed information on the display unit; and a process of causing the display unit to display the (Continued)

clock hand image and the prescribed information in accordance with the synthesized image data.

18 Claims, 8 Drawing Sheets

(56) References Cited

FOREIGN PATENT DOCUMENTS

| | | |
|---|---|---|
| JP | 2007-57292 A | 3/2007 |
| JP | 2012-189531 A | 10/2012 |

* cited by examiner

TIMEPIECE, METHOD OF CONTROLLING TIMEPIECE DISPLAY, AND STORAGE MEDIUM

BACKGROUND OF THE INVENTION

Technical Field

The present invention relates to a timepiece, a method of controlling timepiece display, and a storage medium.

Background Art

One type of conventionally-known display device displays a clock image in which clock hand images are used to show the time in order to simulate an analog clock that allows a user to read the time. As described in Japanese Patent Application Laid-Open Publication No. 2012-189531, for example, in this type of display device, similar to in a chronograph-style watch, information other than the time shown by the movement of the clock hand images is displayed on the dial in order to achieve an analog clock display that increases the amount of information available to the user.

SUMMARY OF THE INVENTION

Accordingly, the present invention is directed to a scheme that substantially obviates one or more of the problems due to limitations and disadvantages of the related art.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a timepiece, including: one or more processors; and a display unit controlled by the one or more processors, wherein the one or more processors perform: a clock hand image obtaining process that obtains a clock hand image; an information obtaining process that obtains prescribed information; a display control process that controls the display unit so as to display on the display unit the clock hand image obtained by the clock hand image obtaining process and the prescribed information obtained by the information obtaining process; a synthesizing process that synthesizes image data of the clock hand image and an image for the prescribed information such that the clock hand image does not overlap with a display region for the prescribed information on the display unit; and a process of causing the display unit to display the clock hand image and the prescribed information in accordance with the synthesized image data.

In another aspect, the present disclosure provides a timepiece, including: one or more processors; and a display unit controlled by the one or more processors, wherein the one or more processors perform: a clock hand image obtaining process that obtains a clock hand image; an information obtaining process that obtains prescribed information; a display control process that controls the display unit so as to display on the display unit the clock hand image obtained by the clock hand image obtaining process and the prescribed information obtained by the information obtaining process; and a display modifying process that modifies at least one of a display manner in which the clock hand image is displayed on the display unit and a display manner in which the prescribed information is displayed on the display unit such that the clock hand image does not overlap with a display region for the prescribed information, and wherein the display modifying process includes a transparency modifying process that modifies a transparency of at least one of the clock hand image and an image of the prescribed information displayed on the display unit.

In another aspect, the present disclosure provides a method of controlling a timepiece performed by one or more processors in a timepiece including a display unit and the one or more processors, the method including: obtaining a clock hand image; obtaining prescribed information; controlling the display unit so as to display on the display unit the obtained clock hand image and the obtained prescribed information; synthesize image data of the clock hand image and an image for the prescribed information such that the clock hand image does not overlap with a display region for the prescribed information on the display unit; and causing the display unit to display the clock hand image and the prescribed information in accordance with the synthesized image data.

In another aspect, the present disclosure provides a computer-readable non-transitory storage medium having stored thereon instructions executable by one or more processors in a timepiece that includes a display unit and the one or more processors, the instructions causing the one or more processor to perform: obtaining a clock hand image; obtaining prescribed information; controlling the display unit so as to display on the display unit the obtained clock hand image and the obtained prescribed information; synthesize image data of the clock hand image and an image for the prescribed information such that the clock hand image does not overlap with a display region for the prescribed information on the display unit; and causing the display unit to display the clock hand image and the prescribed information in accordance with the synthesized image data.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention. It is to be understood that both the foregoing general description and the following detailed description are exemplary and explanatory, and are intended to provide further explanation of the invention as claimed.

BRIEF DESCRIPTION OF THE DRAWINGS

The detailed descriptions below are intended to be read with reference to the following figures in order to gain a deeper understanding of the present application.

DETAILED DESCRIPTION OF EMBODIMENTS

Next, embodiments of the present invention will be described with reference to figures.

Figure 1:
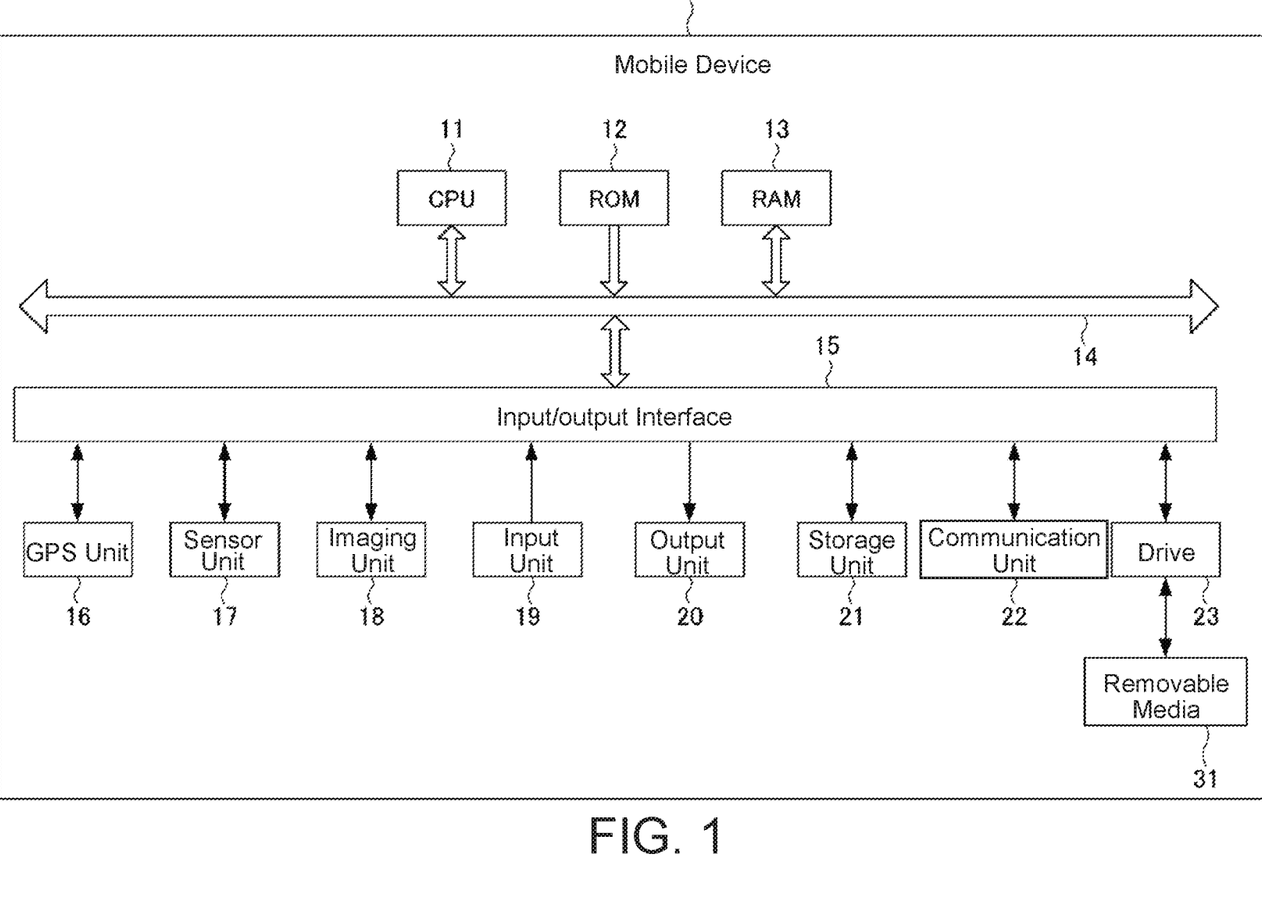
FIG. 1 is a block diagram illustrating a hardware configuration of a mobile device 1 according to a timepiece embodiment of an electronic device of the present invention.

FIG. 1 is a block diagram illustrating a hardware configuration of a mobile device 1 according to a timepiece embodiment of an electronic device of the present disclosure.

The mobile device 1 is configured as a smartwatch, for example.

As illustrated in FIG. 1, the mobile device 1 includes a central processing unit (CPU) 11, a read-only memory (ROM) 12, a random-access memory (RAM) 13, a bus 14, an input/output interface 15, a GPS unit 16, a sensor unit 17, an imaging unit 18, an input unit 19, an output unit 20, a storage unit 21, a communication unit 22, and a drive 23.

The CPU 11 executes various processes in accordance with programs stored in the ROM 12 or programs loaded into the RAM 13 from the storage unit 21.

The RAM 13 also appropriately stores any data or the like that the CPU 11 needs to execute these various processes.

The CPU 11, the ROM 12, and the RAM 13 are connected to one another via the bus 14. The input/output interface 15 is also connected to the bus 14. The GPS unit 16, the sensor unit 17, the imaging unit 18, the input unit 19, the output unit 20, the storage unit 21, the communication unit 22, and the drive 23 are connected to the input/output interface 15.

The GPS unit 16 receives GPS signals from a plurality of GPS satellites via a GPS receiving antenna (not illustrated in the figure). The CPU 11, on the basis of the GPS signals received by the GPS unit 16, obtains positional information, such as latitude, longitude, and elevation information, that indicates the current location of the device.

The sensor unit 17 performs various sensing operations related to gyroscopic information, acceleration, geomagnetism, and GPS and outputs orientation information and positional information.

The imaging unit 18 includes an optical lens unit and an image sensor (not illustrated in the figure).

The optical lens unit includes lenses for collecting light to image a subject, such as a focusing lens and a zoom lens, and the like.

The focusing lens is a lens that focuses an image of the subject onto the light-receiving face of the image sensor. The zoom lens is a lens that allows focal length to be freely changed within a prescribed range.

The optical lens unit also includes a peripheral circuit for adjusting settings and parameters such as focal point, exposure, and white balance as necessary.

The image sensor includes a photoelectric conversion element, an analog front-end (AFE), and the like.

The photoelectric conversion element is a complementary metal-oxide-semiconductor (CMOS) photoelectric conversion element or the like, for example. The subject image from the optical lens unit is focused onto this photoelectric conversion element. The photoelectric conversion element then photoelectrically converts (images) the subject image, accumulates an image signal for a prescribed period of time, and sequentially supplies the accumulated image signal to the AFE as an analog signal.

The AFE executes various signal processing processes such as an analog-to-digital (A/D) conversion process on this analog image signal. These various signal processing processes yield a digital signal, which the imaging unit 18 outputs as an output signal.

The output signal of the imaging unit 18 is then supplied as appropriate to the CPU 11 and an image processor and the like (not illustrated in the figure) as captured image data.

The input unit 19 includes various types of buttons and the like and inputs various types of information in accordance with user input operations.

The output unit 20 includes a display, speakers and the like and outputs images and sound. In the present embodiment, an input unit 19 that can detect input operations such as taps and swipes is arranged layered together with an output unit 20 constituted by a display that displays images, icons, and the like, thereby forming a touch panel interface.

The storage unit 21 is a hard disk or a dynamic random-access memory (DRAM), for example, and stores various types of image data.

The communication unit 22 controls communication with other devices (not illustrated in the figure) via a network such as the internet.

The drive 23 accepts, as appropriate, removable media 31 such as magnetic disks, optical discs, magneto-optical discs, or semiconductor memory. Programs read from the removable media 31 by the drive 23 are installed to the storage unit 21 as necessary. Moreover, similar to the storage unit 21, the removable media 31 can store various types of data such as the image data stored in the storage unit 21.

The mobile device 1 configured as described above has an analog clock display feature for displaying the time. In this analog clock display, information corresponding to selected features (hereinafter, "presentation information") is displayed at a position that does not overlap with the clock hands. In other words, the mobile device 1 displays the presentation information so as to avoid the clock hands that move as time elapses.

FIGS. 2A to 2D are schematic drawings for explaining the analog clock display of the present embodiment.

Figure 2A:
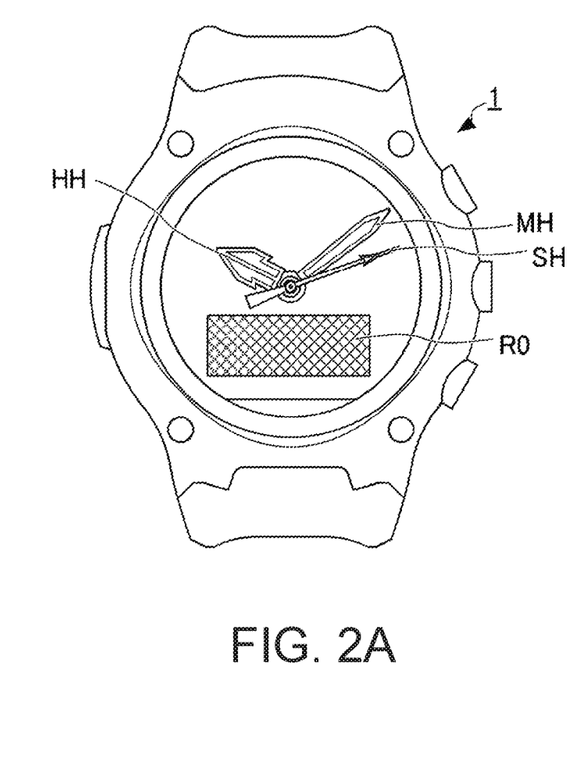
FIGS. 2A to 2D are schematic drawings for explaining an analog clock display in the present embodiment.

As illustrated in FIG. 2A, in the analog clock display of the present embodiment, clock hand images HH, MH, and SH that show the time are arranged with the center of the display screen set as the center of rotation to achieve the analog clock display of the timepiece. Moreover, in the present embodiment, in an initial settings state, for example, presentation information corresponding to a selected feature is displayed in a prescribed region (hereinafter, "default display region") R0 in the background of the analog clock display.

The mobile device 1 of the present embodiment has a feature for, when the clock hands and the presentation information overlap, displaying the presentation information in a different non-overlapping region. As illustrated in the example in FIG. 2B, when this feature is triggered, the presentation information is displayed in a largest region (hereinafter, "modified display region") R2 among regions R1 between the clock hand image HH for a short hand that shows the hour, the clock hand image MH for a long hand that shows minutes, and the clock hand image SH for a seconds hand that shows seconds.

Figure 2B:
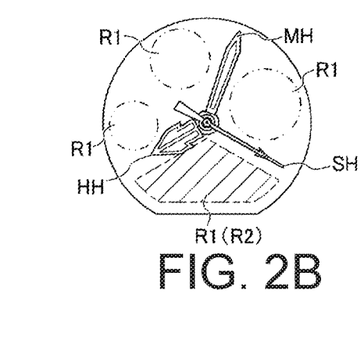

Although in this example the presentation information is displayed in one of the regions R1 between the clock hand image HH for the short hand (hour hand) that shows the hour, the clock hand image MH for the long hand (minute hand) that shows minutes, and the clock hand image SH for the seconds hand that shows seconds, a display region may be determined from among only the regions between the clock hand image HH for the short hand that shows the hour and the clock hand image MH for the long hand that shows minutes. Moreover, the region between the short hand and the periphery of the screen may be treated as a display region and used for the modified display region. In this case, the manner in which the presentation information is displayed is modified such that the presentation information fits the size of this region when displayed.

Furthermore, it is controlled such that the regions between the clock hand images are configured in accordance with the shapes of the clock hand images, which may have a special decorative shape or be thick in shape, for example.

Figure 2C:
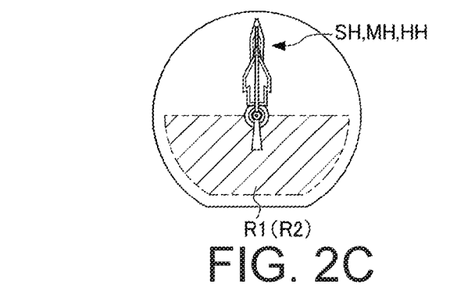

In addition, as illustrated in the example in FIG. 2C, at times when the clock hand images all overlap, a position that is symmetric to the overlapping position may be set as the modified display region R2.

Figure 2D:
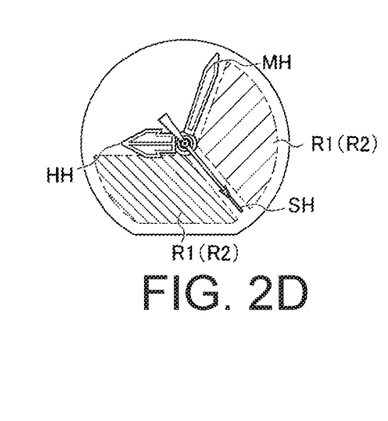

Moreover, as illustrated in the example in FIG. 2D, a plurality of regions may be set as modified display regions R2. When a plurality of regions are set as the modified display regions R2, different types of information (including the presentation information and other information) may be displayed.

Figure 3:
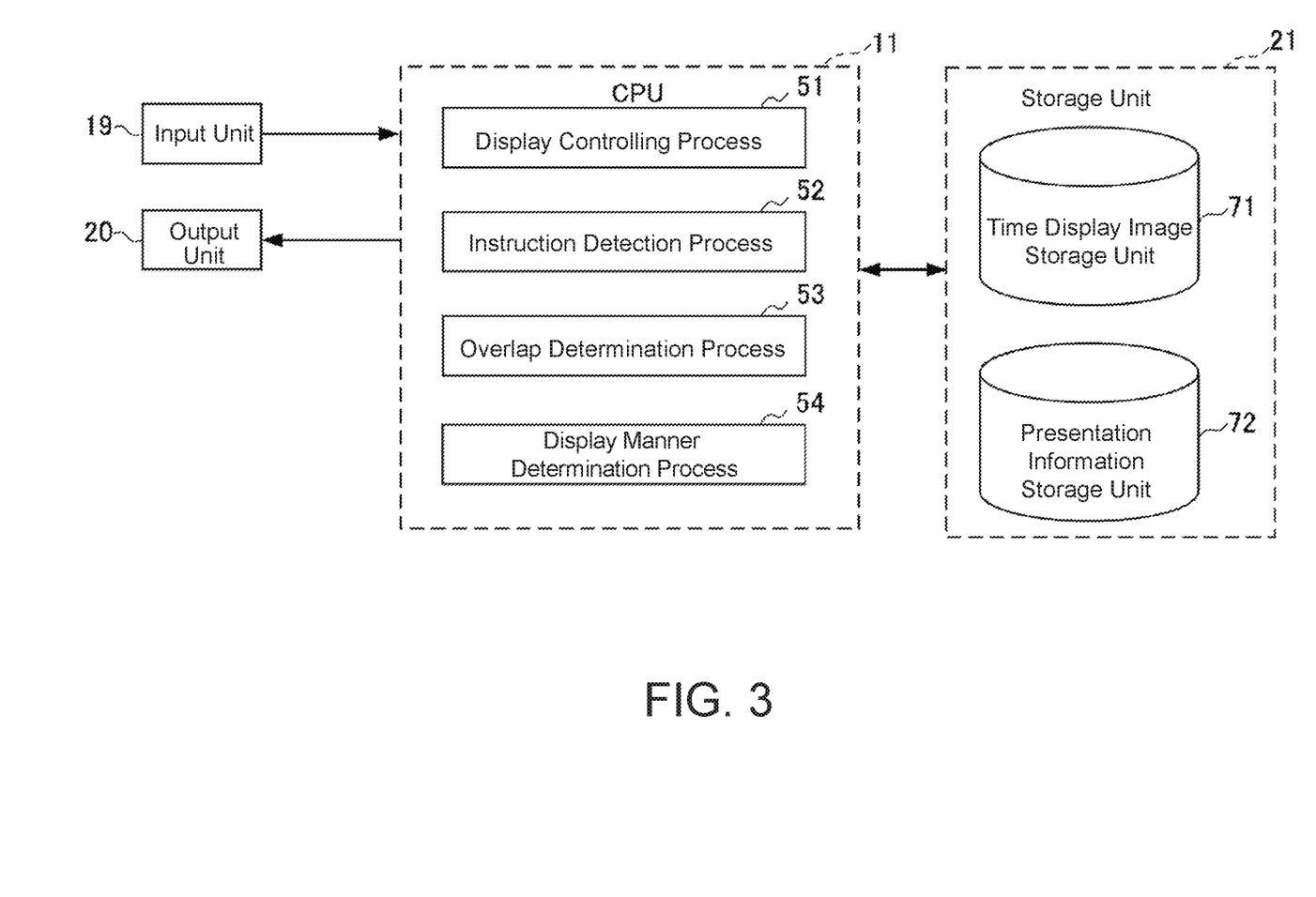
FIG. 3 is a functional block diagram illustrating, among functional configurations of the mobile device 1 illustrated in FIG. 1, a functional configuration for executing an information display process.

FIG. 3 is a functional block diagram illustrating, among functional configurations of the mobile device 1 illustrated in FIG. 1, a functional configuration for executing an information display process.

This information display process is a sequence of processes for, in the analog clock display of the timepiece, displaying the clock hand images or the presentation information with the modified display manner when it is determined that the position of the clock hand images showing the time and the position of the presentation information overlap when displayed.

As illustrated in FIG. 3, when executing the information display process, the CPU 11 perform a display controlling process 51, an instruction detection process 52, an overlap determination process 53, and a display manner determination process 54.

A time display image storage unit 71 and a presentation information storage unit 72 are configured as regions of the storage unit 21.

The time display image storage unit 71 stores image data for displaying the time, such as clock hand images for the short hand, the long hand, the seconds hand, and the like that are needed for the analog clock display, as well as time index images.

The presentation information storage unit 72 stores presentation information corresponding to various features.

The presentation information is information corresponding to various types of features, such as digital time information, sensor information from the GPS unit 16 and the sensor unit 17, received message information, and configured schedule information.

The display controlling process 51 controls the output unit 20 so as to display the clock hand images in accordance with the time and so as to display the presentation information at a prescribed position behind the clock hand images on the clock display screen.

When it is determined that the clock hand images and the presentation information will be displayed overlapping, for example, the display controlling process 51 controls the output unit 20 so as to display the presentation information at a position that avoids the clock hand images. In the present embodiment, the display controlling process 51 controls the output unit 20 so as to display the presentation information in the modified display region, which is the largest region among the regions where the clock hand images are not currently present.

The instruction detection process 52 detects instructions. For example, the instruction detection process 52 detects an instruction to display the presentation information in a non-overlapping manner in which overlap is avoided when the presentation information and the clock hand images overlap (hereinafter, "overlap avoidance display instruction"), which is input via the input unit 19 in the form of a user operation. Note that this overlap avoidance display instruction is not limited to being a user operation and may be detected when prescribed conditions are satisfied. For example, this instruction may be automatically detected on the basis of conditions such as when the user tilts the device to view the display, times at which the user is likely to view the display, or alarm times or the like.

The overlap determination process 53 determines from the displayed time whether the clock hand images and the presentation information are overlapping.

In the initial settings state illustrated in FIG. 2A, for example, the presentation information is displayed in the default display region R0, and therefore the overlap determination process 53 determines whether the current time is a time at which the clock hand images are positioned within the default display region R0. Moreover, when it is determined that these items are overlapping and the display position of the presentation information is moved, the overlap determination process 53 determines whether the current time is a time at which the clock hand images are positioned within the modified display region R2 to which the presentation information was moved.

The display manner determination process 54 determines the display manner for the presentation information in accordance with the display region of the clock hand images. For example, when the clock hand images and the presentation information overlap, the display manner determination process 54 determines a display position for the presentation information on the basis of the position of the clock hand images so that the presentation information can be displayed at a position (the modified display region) that avoids the position of the clock hand images and prevents the presentation information from being difficult to see. In other words, as illustrated in FIG. 2A, the display position is determined by calculating the positions of the clock hand images HH, MH, and SH from the displayed time; identifying the regions R1 between the clock hand images HH, MH, and SH; and setting the largest region as the modified display region R2. Moreover, the display manner determination process 54 identifies the regions in which the clock hand images are not present on the basis of the shapes/sizes of the clock hand images, angle calculations based on the time, and the like, for example.

Figure 4:
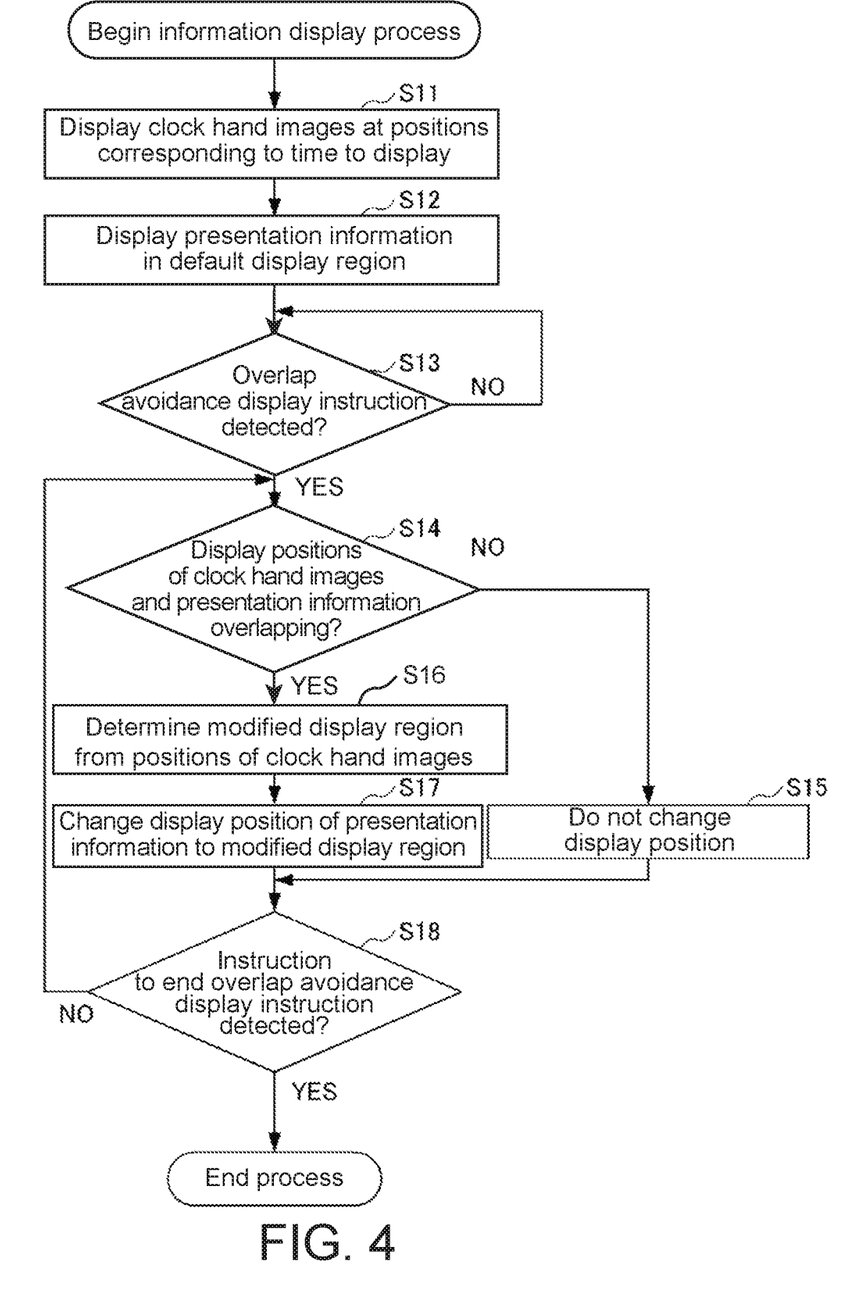
FIG. 4 is a flowchart illustrating the flow of the information display process executed by the mobile device 1 illustrated in FIG. 1 and having the functional configuration illustrated in FIG. 3.

FIG. 4 is a flowchart illustrating the flow of the information display process executed by the mobile device 1 illustrated in FIG. 1 and having the functional configuration illustrated in FIG. 3 according to the present embodiment.

The information display process begins when the user inputs an information display process start operation to the input unit 19.

In step S11, the display controlling process 51 controls the output unit 20 so as to display the clock hand images at positions corresponding to the time to display.

In step S12, the display controlling process 51 controls the output unit 20 so as to display the presentation information in the default display region (see the example in FIG. 2A).

In step S13, the instruction detection process 52 determines whether an overlap avoidance display instruction input to the input unit 19 by the user, for example, has been detected.

If no overlap avoidance display instruction has been detected, the determination in step S13 yields NO, and the process enters a standby state.

If an overlap avoidance display instruction has been detected, the determination in step S13 yields YES, and the process proceeds to step S14.

In step S14, the overlap determination process 53 determines whether the positions of the clock hand images corresponding to the time are currently overlapping with the information display region in which the presentation information is displayed.

If the display positions of the clock hand images and the presentation information are overlapping, the determination in step S14 yields YES, and the process proceeds to step S16.

If the display positions of the clock hand images and the presentation information are not overlapping, the determination in step S14 yields NO, and the process proceeds to step S15.

In step S15, the display controlling process 51 controls the output unit 20 so as to display the clock hand images and the presentation information without changing the display position of the presentation information. Then, the process proceeds to step S18.

In step S16, the display manner determination process 54 determines the modified display region from the positions of the clock hand images. For example, the display manner determination process 54 determines the largest region among the regions R1 between the clock hand images HH, MH, and SH to be the modified display region R2 (see FIG. 2B).

In step S17, the display controlling process 51 controls the output unit 20 so as to change the display position of the presentation information to the modified display region and display the information in that region.

In step S18, the instruction detection process 52 determines whether an instruction to end the overlap avoidance display instruction input to the input unit 19 by the user, for example, has been detected.

If no end instruction has been detected, the determination in step S18 yields NO, and the process returns to step S14.

If an end instruction has been detected, the determination in step S18 yields YES, and the information display process ends.

Another Embodiment

Another embodiment of the present invention will be described with reference to FIGS. 5-8. In the embodiment described above, the presentation information is displayed in a region in which the clock hand images are not present (that is, at a position that does not overlap with the clock hand images) based on the current arrangement of the clock hands. In contrast, in the this embodiment, when displaying the presentation information, the clock hands are moved to a prescribed position that is determined in advance, so that the display region for the presentation information is secured.

Figure 5:
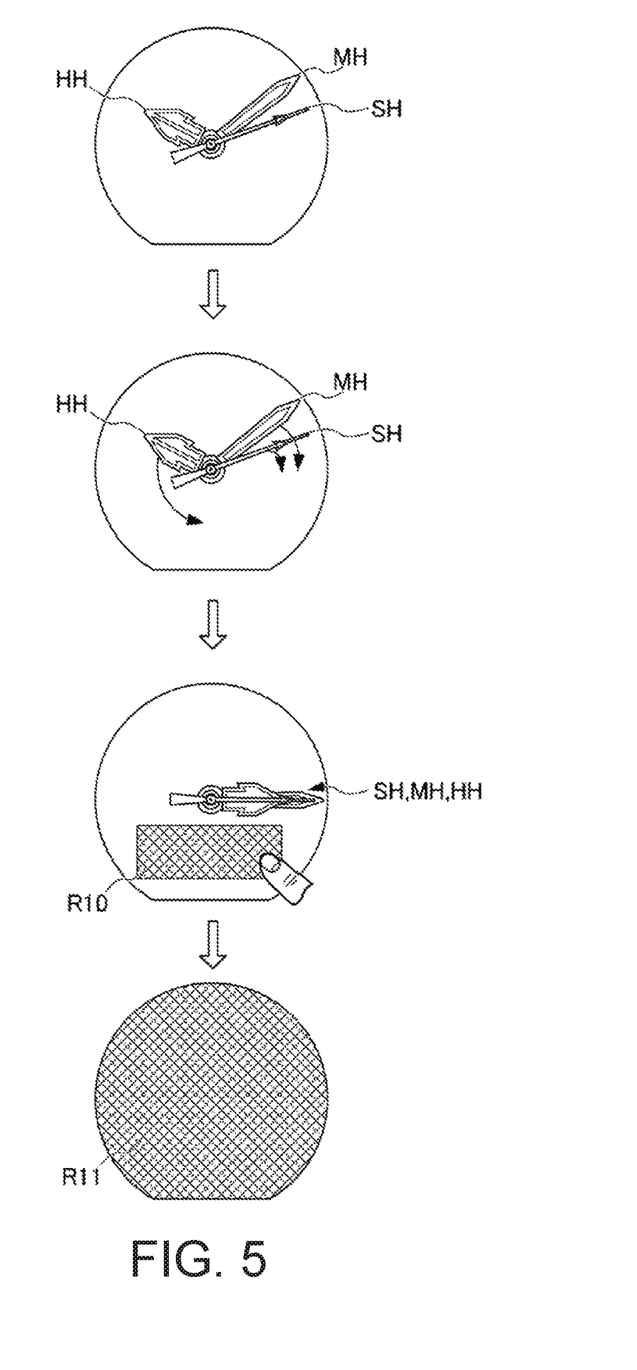
FIG. 5 is a schematic drawing for explaining another example of an analog clock display in the present embodiment.

FIG. 5 is a schematic drawing for explaining an analog clock display according to the present embodiment.

As illustrated in FIG. 5, in another example of an information display process for the analog clock display of the present embodiment, first, when an instruction to display presentation information is detected while a prescribed time (in the present embodiment, the current time) is being displayed, all of the clock hands (the hour hand HH, the minute hand MH, and the seconds hand SH) rotate so as to escape to a prescribed position. In the present embodiment, the escape position is the three o'clock position. Moreover, the movement of the clock hands escaping (rotating) is displayed sequentially as an animation. In the present embodiment, the clock hands are displayed moving in different rotation directions depending on the positions of the clock hands. Alternatively, all of the clock hands may be moved in the same direction, or the movement order and speed may be changed. Moreover, because the time is not displayed when the clock hands are in the escaped state, the time may be separately displayed. In this case, for example, the time (analog/digital) may be displayed in an information display region R10, or the time (analog/digital) may be displayed in another free region or near the clock hands. This allows the user to always be able to see the time, even when the clock hands are in the escaped state.

In the information display process described above, all of the clock hands escape to the same position in order to allocate a region in which the presentation information is displayed. Moreover, making all of the clock hands escape to the same position makes it possible to increase the visibility of the presentation information because the user can focus on the presentation information without having to divide any attention to the clock hand images.

Once the clock hands have escaped, the presentation information is displayed in a prescribed region (in the present embodiment, the information display region R10) among the regions that do not overlap with the clock hand images.

Then, in this embodiment, when the information display region R10 is selected via a touch operation or the like, a screen for the feature corresponding to the currently displayed presentation information is displayed full-screen (in a full-screen region R11), and behaviors and display processes corresponding to that feature are executed.

FIGS. 6A to 6D and FIGS. 7A to 7C are schematic drawings illustrating examples of full-screen displays for features corresponding to presentation information in the present embodiment.

Figure 6A:
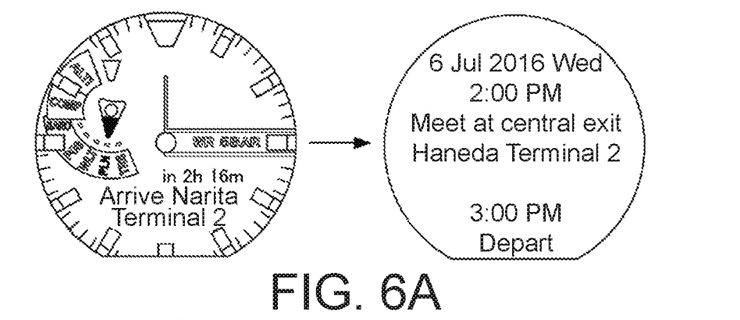
FIGS. 6A to 6D are schematic drawings illustrating examples of full-screen displays for features corresponding to presentation information in the present embodiment.

In the example illustrated in FIG. 6A, an upcoming schedule is displayed as the presentation information, and a scheduling feature is displayed full-screen.

Figure 6B:
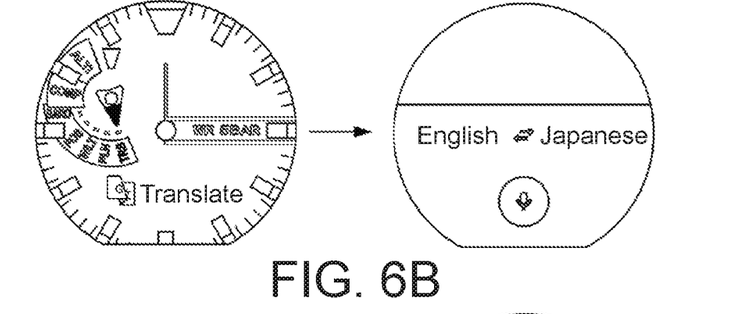

In the example illustrated in FIG. 6B, a message indicating that a translation feature is available is displayed as the presentation information, and a translation feature is displayed full-screen.

Figure 6C:
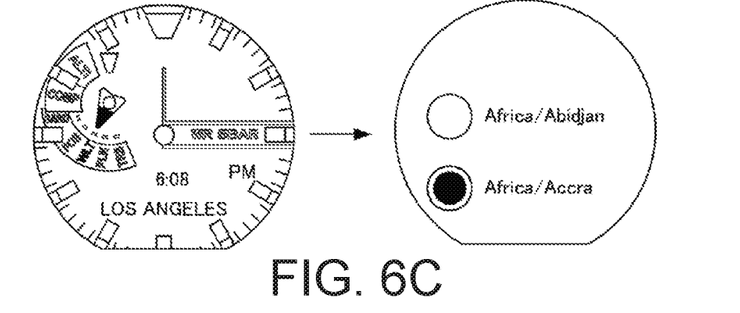

In the example illustrated in FIG. 6C, a city name and time corresponding to a city registered as a hometown are displayed as the presentation information, and a hometown registration feature is displayed full-screen.

Figure 6D:
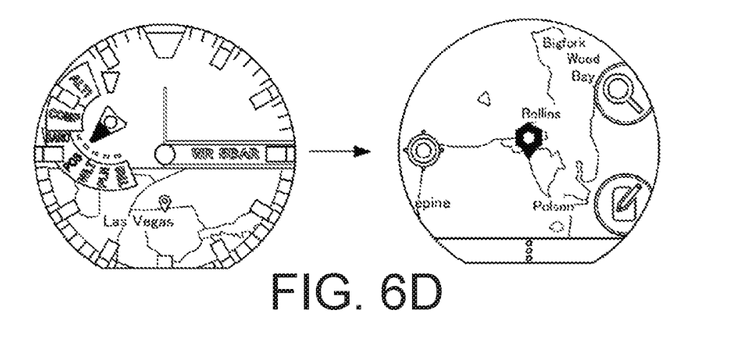

In the example illustrated in FIG. 6D, a map of areas surrounding the current location is displayed as the presentation information, and a map display feature including the map display of the areas surrounding the current location is displayed full-screen.

Figure 7A:
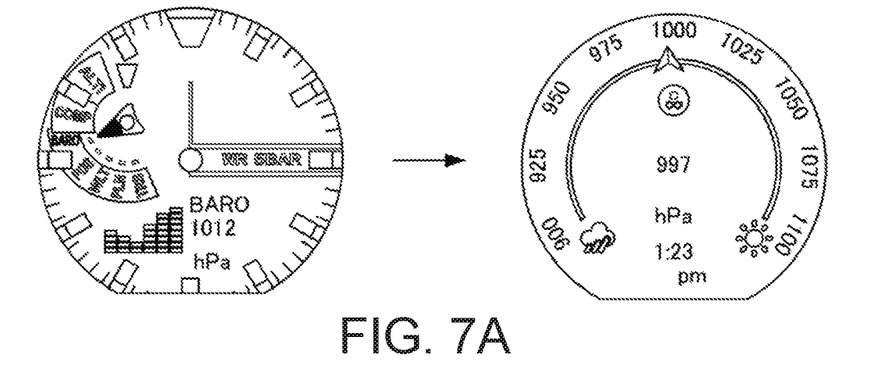
FIGS. 7A to 7C are schematic drawings illustrating examples of full-screen displays for features corresponding to presentation information in the present embodiment.

In the example illustrated in FIG. 7A, the current atmospheric pressure and a graph of changes in atmospheric pressure are displayed as the presentation information, and a barometer display feature is displayed full-screen.

Figure 7B:
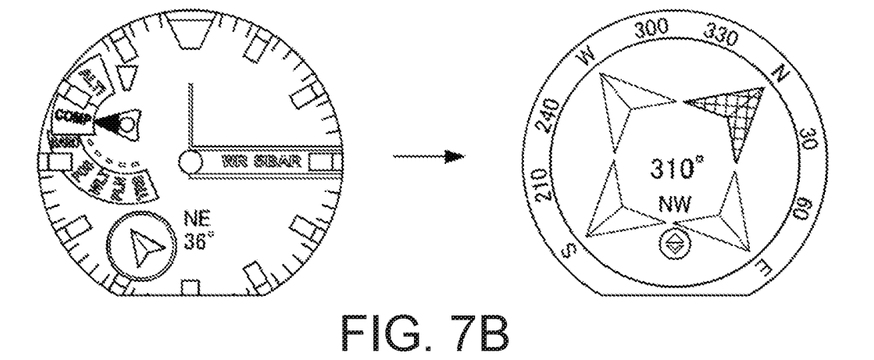

In the example illustrated in FIG. 7B, a direction is displayed as the presentation information, and a compass display feature is displayed full-screen.

Figure 7C:
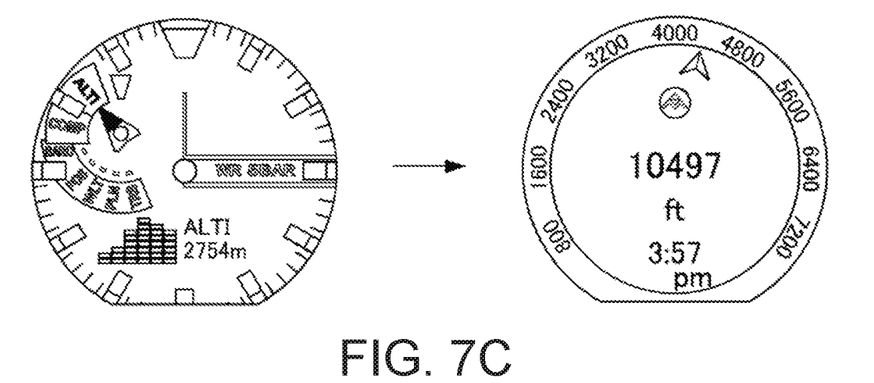

In the example illustrated in FIG. 7C, an altitude and a graph of changes in altitude are displayed as the presentation information, and an altitude display feature is displayed full-screen.

Figure 8:
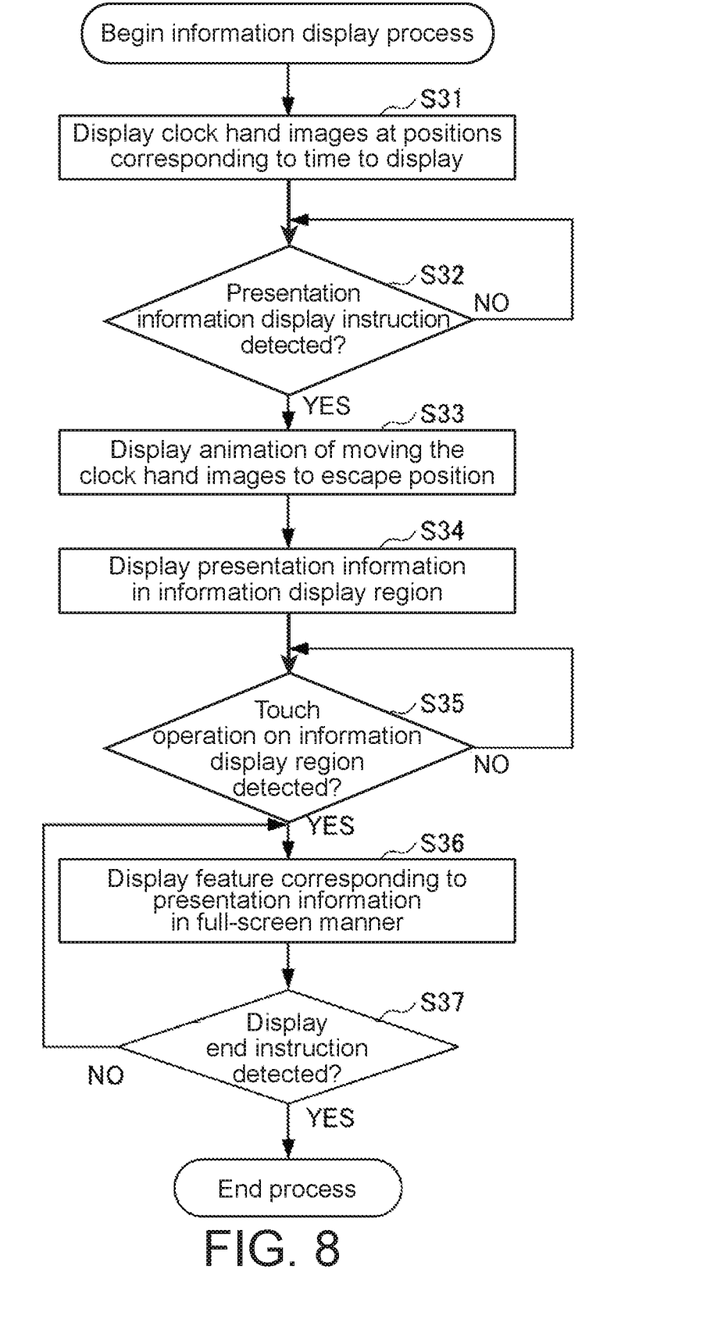
FIG. 8 is a flowchart illustrating another flow of the information display process executed by the mobile device 1 illustrated in FIG. 1 and having the functional configuration illustrated in FIG. 3.

FIG. 8 is a flowchart illustrating an exemplary flow of the information display process executed by the mobile device 1 illustrated in FIG. 1 and having the functional configuration illustrated in FIG. 3 according to the present embodiment.

The information display process begins when the user inputs an information display process start operation to the input unit 19.

In step S31, the display controlling process 51 controls the output unit 20 so as to display the clock hand images at positions corresponding to the time to display (see FIG. 5).

In step S32, the instruction detection process 52 determines whether a presentation information display instruction input to the input unit 19 by the user, for example, has been detected.

If no presentation information display instruction has been detected, the determination in step S32 yields NO, and the process enters a standby state.

If a presentation information display instruction has been detected, the determination in step S32 yields YES, and the process proceeds to step S33.

In step S33, the display controlling process 51 controls the output unit 20 so as to display an animation of moving the clock hand images to the escape position (in the present embodiment, the three o'clock position) (see FIG. 5).

In step S34, the display controlling process 51 controls the output unit 20 so as to display the presentation information in the information display region (see FIG. 5).

In step S35, the instruction detection process 52 determines whether a touch operation on the information display region performed by the user, for example, has been detected.

If no touch operation on the information display region has been detected, the determination in step S35 yields NO, and the process enters a standby state.

If a touch operation on the information display region has been detected, the determination in step S35 yields YES, and the process proceeds to step S36.

In step S36, the display controlling process 51 controls the output unit 20 so as to display the feature corresponding to the presentation information in a full-screen manner. Then, on the basis of an operation or the like, a feature is displayed as illustrated in FIG. 5, for example, and behaviors and display processes corresponding to that feature are executed (see FIGS. 6A to 6D and FIGS. 7A to 7C).

In step S37, the instruction detection process 52 determines whether a display end instruction input to the input unit 19 by the user, for example, has been detected.

If no display end instruction has been detected, the determination in step S37 yields NO, and the process returns to step S36.

If a display end instruction has been detected, the determination in step S37 yields YES, and the information display process ends.

In the embodiments described above, the process of modifying the display manner may be performed upon determining that an overlap has occurred after detecting an overlap avoidance display instruction, but the present invention is not limited to such a configuration. For example, the process of modifying the display manner may be executed on the basis of just detection of an overlap avoidance display instruction, or the process of modifying the display manner may be executed on the basis of overlap determination results regardless of any instructions.

Moreover, in regards to the specific manner in which the display of the hand images and/or the presentation information are modified, various other manners can be contemplated based on various conditions. For example, the display position of the presentation information can be changed on the basis of the positions of the clock hand images, as described above or in some other ways, a fixed information display region can be established and the clock hand images can be made to escape to a prescribed position, as described above or in some other ways, the transparency of the clock hand images or the presentation information can be modified.

For example, the display manner for the hand images and/or the presentation information may be modified in accordance with various conditions, such as: prescribed settings configured in advance by the user; the positions of the clock hand images; the operations, behaviors, or device orientations associated with the action of the user checking the time or the presentation information; receipt of schedules or messages; or moving to prescribed locations.

The mobile device 1 configured as described above is an electronic device including an output unit 20.

The mobile device 1 includes a display controlling process 51 and an overlap determination process 53.

In the display controlling process 51, clock hand images are obtained. The display controlling process 51 also obtains presentation information (prescribed information). Moreover, the display controlling process 51 controls the output unit 20 so as to display the clock hand images at positions corresponding to a current time and so as to display the presentation information (prescribed information) near the display positions of the clock hand image.

The overlap determination process 53 determines whether the clock hand images and the presentation information (prescribed information) are displayed overlapping by the display controlling process 51.

When the overlap determination process 53 determines that the clock hand images and the presentation information (prescribed information) are displayed overlapping, the display controlling process 51 modifies the display manner such that the clock hand images and the display region of the presentation information (prescribed information) do not overlap.

Therefore, in the mobile device 1, it is possible to implement display control in a manner that, while maintaining the design aesthetics of an analog clock display, makes it possible for a user to easily read information other than time information shown by clock hand images.

The display controlling process 51 modifies, as the display manner, a display position or a display size of the presentation information (prescribed information) such that the presentation information (prescribed information) does not overlap with the clock hand images.

Therefore, in the mobile device 1, it is possible to implement display control in a manner that, while maintaining the design aesthetics of an analog clock display, makes it possible for a user to easily read information other than time information shown by clock hand images.

When it is determined that the clock hand images and the presentation information (prescribed information) are displayed overlapping, the display controlling process 51 modifies the display manner such that the clock hand images and the presentation information (prescribed information) are not displayed overlapping.

Therefore, in the mobile device 1, it is possible to implement display control in a manner that, while maintaining the design aesthetics of an analog clock display, makes it possible for a user to easily read information other than time information shown by clock hand images.

A display manner determination process 54 calculates a display position and a display size for the presentation information (prescribed information) as a display region for the presentation information (prescribed information).

When it is determined that the clock hand images and the presentation information (prescribed information) are displayed overlapping, the display manner determination process 54 modifies the display position of the clock hand images so as to move the clock hand images on the basis of the calculated display region.

Therefore, in the mobile device 1, it is possible to move the clock hand images in accordance with the display position and the display size of the presentation information.

When modifying the display position of the clock hand image so as to move the clock hand image to a prescribed escape position, the display controlling process 51 displays time information in the display region for the prescribed information without using the clock hand images.

Therefore, in the mobile device 1, the user can check the time even after the clock hand images escape and analog time is no longer displayed.

The display controlling process 51 modifies the display manner of the presentation information (prescribed information) in accordance with the display position and the display size of the clock hand images displayed on the output unit 20.

Therefore, in the mobile device 1, it is possible to implement display control in a manner that, while maintaining the design aesthetics of an analog clock display, makes it possible for a user to easily read information other than time information shown by clock hand images.

The display controlling process 51 displays, with an animation, a movement of transitioning from before modifying the display manner to after modifying the display manner.

Therefore, in the mobile device 1, it is possible to modify the display manner in a manner that is not unnatural to the user.

When a display position of the display manner of the clock hand images is modified, the display controlling process 51 displays, with an animation, the movement of transitioning from before modifying the display manner to after modifying the display manner as a movement corresponding to a movement of the clock hand images when displaying time.

Therefore, in the mobile device 1, it is possible to modify the display position of the clock hand images using a movement similar to the movement when normally displaying time, thereby making it possible to modify the display manner in a manner that is not unnatural to the user.

The present invention is not limited to the embodiments described above, and various modifications, improvements, and the like within the scope of making it possible to achieve the objectives of the present invention are included in the present invention.

Although the embodiments described above are configured to modify the position of the presentation information as the display manner, position, size (for example, changing to a smaller size), shape, transparency, display layer (foreground/background), and the like, of the presentation information may be modified. Moreover, when transparency is modified, the transparency of the clock hand images can be increased to achieve a more transparent state than that of the presentation information; to the contrary, the transparency of the presentation information can be reduced to achieve a stronger state than that of the clock hand images. Furthermore, the coloring and color brightness may be modified. In addition, modifying the transparency and the like includes making either the clock hand images or the presentation information disappear.

Moreover, although the embodiments described above are configured to modify the display manner of the presentation information, the display manner of the clock hand images may be modified. For example, display manner of the clock hand images such as position, size (for example, changing to a smaller size), shape, or transparency may be modified. Furthermore, a prescribed fixed escape position (such as the three o'clock position, for example) may be established, and the clock hand images may be moved to this position.

In addition, in the embodiments described above, the depiction of moving the clock hand images or the presentation information to a modified display region can be implemented as continuous movement or as movement between discrete positions, for example. Moreover, the movement speed may be controlled to achieve movements corresponding to the distance or movement amount of the clock hand images, such as moving quickly for far distances and slowly for short distances. Furthermore, the depiction of the movement may be controlled so as to be modified in accordance with battery level.

For example, when modifying the display manner of the clock hand images or the presentation information, the display manner can be modified so as to change from a current display state to a final display state in a continuous manner.

Moreover, although the embodiments described above are configured such that the overlap avoidance display instruction is triggered by a user operation, this instruction may be triggered automatically. When triggered automatically, the trigger may be detection of prescribed states such as touch operations, behavior determination, wrist movements (tilt changes), times (schedules), or location (whether the user has arrived at a prescribed location) using sensor information from the GPS unit 16 or the sensor unit 17, preconfigured schedule information, or the like. Furthermore, the trigger may be controlled so as to be changed in accordance with battery level.

Moreover, although the embodiments described above are configured to display the current time, the present invention may be configured to display a prescribed time, a user-specified hypothetical time, a time shifted (forward or backward) from the current time by a prescribed amount of time, or the like, for example.

Furthermore, although in the embodiments described above the mobile device 1 to which the present invention is applied was described as being a smartwatch as an example, the present invention is not particularly limited to this example.

For example, the present invention can be applied to general electronic devices that have information display process features. More specifically, the present invention can be applied, for example, to notebook personal computers, printers, television receivers, video cameras, digital cameras, portable navigation devices, mobile phones, smartphones, portable game systems, and the like.

The sequence of processes described above can be implemented with hardware or can be implemented with software.

In other words, the functional configuration illustrated in FIG. 3 is only an example and is not particularly limited. The mobile device 1 may have any features as long as those features make it possible to perform the sequence of processes described above overall, and the types of functional blocks used to implement these features are not particularly limited to the examples illustrated in FIG. 3.

Moreover, each functional block may be configured solely as a hardware unit, may be configured solely as a software unit, or may be configured as a combination of both.

The functional configuration of the present embodiments is implemented with a processor that executes arithmetic processes. Examples of processors that can be used in the present embodiment include processors configured using various types of processing devices such as single processors, multiprocessors, and multi-core processors, as well as configurations in which these various types of processing devices are integrated together with processing circuits such as application-specific integrated circuits (ASICs) or field-programmable gate arrays (FPGAs).

When the sequence of processes is implemented using software, the programs constituting that software are installed on a computer or the like from a network or storage media.

The computer may be a computer embedded in dedicated hardware. Moreover, the computer may be a computer that can perform various types of functions by installing various types of programs, such as a general-purpose personal computer.

The storage media storing these programs includes not only the removable media 31 illustrated in FIG. 1 that is distributed separately from the main device to provide the programs to users, but also storage media that is already embedded in the main device in advance and provided to users, and the like. The removable media 31 is magnetic disks (including floppy disks), optical discs, magneto-optical discs, or the like, for example. The optical discs are Compact Disc Read-Only Memory (CD-ROMs), Digital Versatile Discs (DVDs), Blu-ray Discs (registered trademark), or the like, for example. The magneto-optical discs are MiniDiscs (MDs) or the like. Moreover, the storage media that is already embedded in the main device in advance and provided to users includes the ROM 12 illustrated in FIG. 1 that stores programs, hard disks included in the storage unit 21 illustrated in FIG. 1, and the like, for example.

Furthermore, in the present specification, steps coded in the programs stored on the storage media include not only processes performed in chronological order in accordance with the order of those steps, but also processes that may not necessarily be performed in chronological order but are performed separately or in parallel.

Although several embodiments of the present invention were described above, these embodiments are only examples and do not limit the technical scope of the present invention. The present invention can take the form of various other embodiments, and various modifications such as removal or replacement of components can be made without departing from the spirit of the present invention. These embodiments and modifications thereof are included within the scope and spirit of the invention described in the present specification and the like and are also included within the scope of the invention as defined in the claims, their equivalents, and the like. In particular, it is explicitly contemplated that any part or whole of any two or more of the embodiments and their modifications described above can be combined and regarded within the scope of the present invention.

What is claimed is:

1. A timepiece, comprising:
one or more processors; and
a display unit controlled by said one or more processors, wherein said one or more processors perform:
   a clock hand image obtaining process that obtains a clock hand image;
   an information obtaining process that obtains prescribed information;
   a display control process that controls the display unit so as to display on the display unit the clock hand image obtained by the clock hand image obtaining process and the prescribed information obtained by the information obtaining process;
   a synthesizing process that synthesizes image data of the clock hand image and an image for the prescribed information such that the clock hand image does not overlap with a display region for the prescribed information on the display unit; and
   a process of causing the display unit to display the clock hand image and the prescribed information in accordance with the synthesized image data.

2. The timepiece according to claim 1, wherein the synthesizing process includes a display modifying process that modifies at least one of a display manner in which the clock hand image is displayed on the display unit and a display manner in which the prescribed information is displayed on the display unit such that, in the modified at least one of the display manners, the clock hand image does not overlap with the display region for the prescribed information.

3. The timepiece according to claim 2, wherein the display modifying process modifies a display position, a display size, a shape, or a transparency of the clock hand image or the prescribed information.

4. The timepiece according to claim 3, wherein said one or more processors further perform:
   a determination process that determines whether the clock hand image and the display region for the prescribed information are displayed overlapping in the display control process in current display manners,
   wherein when the determination process determines that the clock hand image and the display region for the prescribed information are displayed overlapping, the display modifying process modifies at least one of the current display manners such that the clock hand image and the display region for the prescribed information do not overlap.

5. The timepiece according to claim 2, wherein the display modifying process modifies a display position or a display size of the clock hand image such that the clock hand image does not overlap with the display region for the prescribed information.

6. The timepiece according to claim 2, wherein the display modifying process modifies a display position of the clock hand image so as to move the clock hand image to a prescribed escape position.

7. The timepiece according to claim 6, wherein when modifying the display position of the clock hand image so as to move the clock hand image to the prescribed escape position, said one or more processors cause the display unit to display time information in the display region for the prescribed information without using the clock hand image.

8. The timepiece according to claim 2,
wherein the display modifying process includes a calculation process that calculates a display position and a display size for the prescribed information as the display region for the prescribed information, and
wherein the display modifying process modifies a display position of the clock hand image so as to move the clock hand image to a prescribed escape position on the basis of the display region calculated by the calculation process.

9. The timepiece according to claim 2, wherein the display modifying process modifies a display position or a display size of the prescribed information such that the prescribed information does not overlap with the clock hand image.

10. The timepiece according to claim 2, wherein the display modifying process modifies the display manner of the prescribed information in accordance with a current display position and a current display size of the clock hand image displayed on the display unit.

11. The timepiece according to claim 2, wherein when the display modifying process modifies the display manner of the clock hand image or the prescribed information, said one or more processor causes the display unit to move the clock hand image or an image of the prescribed information for which the display manner has been modified in a continuous manner from an initial display state to a modified display state.

12. The timepiece according to claim 2, further comprising:
an input unit that receives a display modification instruction,
wherein when the input unit receives the display modification instruction, said one or more processor performs the display modifying process.

13. The timepiece according to claim 2, wherein the display control process controls the display unit to display, with an animation, a movement of transitioning from before modifying said at least one the display manners to after modifying said at least one of the display manners.

14. The timepiece according to claim 13, wherein the display modifying process modifies a current display position of the clock hand image, and said one or more processor causes the display unit to display, with an animation, a movement of the clock hand image from the current display position to a modified display position.

15. The timepiece according to claim 2, wherein the display modifying process modifies both of the display manner in which the clock hand image is displayed on the display unit and the display manner in which the prescribed information is displayed on the display unit.

16. A timepiece, comprising:
one or more processors; and
a display unit controlled by said one or more processors, wherein said one or more processors perform:
a clock hand image obtaining process that obtains a clock hand image;
an information obtaining process that obtains prescribed information;
a display control process that controls the display unit so as to display on the display unit the clock hand image obtained by the clock hand image obtaining process and the prescribed information obtained by the information obtaining process; and
a display modifying process that modifies at least one of a display manner in which the clock hand image is displayed on the display unit and a display manner in which the prescribed information is displayed on the display unit such that the clock hand image does not overlap with a display region for the prescribed information, and
wherein the display modifying process includes a transparency modifying process that modifies a transparency of at least one of the clock hand image and an image of the prescribed information displayed on the display unit.

17. A method of controlling a timepiece performed by one or more processors in a timepiece including a display unit and said one or more processors, the method comprising:
obtaining a clock hand image;
obtaining prescribed information;
controlling the display unit so as to display on the display unit the obtained clock hand image and the obtained prescribed information;
synthesize image data of the clock hand image and an image for the prescribed information such that the clock hand image does not overlap with a display region for the prescribed information on the display unit; and
causing the display unit to display the clock hand image and the prescribed information in accordance with the synthesized image data.

18. A computer-readable non-transitory storage medium having stored thereon instructions executable by one or more processors in a timepiece that includes a display unit and said one or more processors, the instructions causing said one or more processor to perform:
obtaining a clock hand image;
obtaining prescribed information;
controlling the display unit so as to display on the display unit the obtained clock hand image and the obtained prescribed information;
synthesize image data of the clock hand image and an image for the prescribed information such that the clock hand image does not overlap with a display region for the prescribed information on the display unit; and
causing the display unit to display the clock hand image and the prescribed information in accordance with the synthesized image data.

* * * * *